United States Patent [19]

Armbruster, Jr. et al.

[11] Patent Number: 4,506,529

[45] Date of Patent: Mar. 26, 1985

[54] STANDPIPE SECURITY APPARATUS

[76] Inventors: Josef Armbruster, Jr., 3927 York BL, Los Angeles, Calif. 90065; Toby Argandona, 21221 Running Branch Rd., Diamond Bar, Calif. 91765

[21] Appl. No.: 429,527

[22] Filed: Sep. 30, 1982

[51] Int. Cl.³ ............................................. B65D 55/14
[52] U.S. Cl. .................................................... 70/168
[58] Field of Search ................. 70/158, 163, 166, 167, 70/168, 169, 172, 164, 170, 171, 173, 232; 220/210

[56] References Cited

U.S. PATENT DOCUMENTS

| | | | |
|---|---|---|---|
| 1,415,517 | 5/1922 | Brown | 70/172 |
| 2,018,534 | 10/1935 | Rike | 70/167 |
| 3,537,283 | 11/1970 | Mross | 70/164 |
| 4,351,446 | 9/1982 | Madden | 220/210 |

FOREIGN PATENT DOCUMENTS 1169343 11/1969 United Kingdom ................. 70/168

Primary Examiner—Robert L. Wolfe
Attorney, Agent, or Firm—Boniard I. Brown

[57] ABSTRACT

An armored and locked cover to protect the cap on a standpipe which forms a connection to a source of valuable liquid such as gasoline. The cover includes a lower portion retained primarily by the standpipe cap and an upper cover portion having predeterminately positioned dogs and lock latches to engage similarly positioned slots in the lower portion for locking the two portions together. Bearing means are provided between the lower portion when a threadably retained cap is used so that rotation of the device does not result in rotation and disconnection of the cap which otherwise would allow the removal of the device.

10 Claims, 8 Drawing Figures

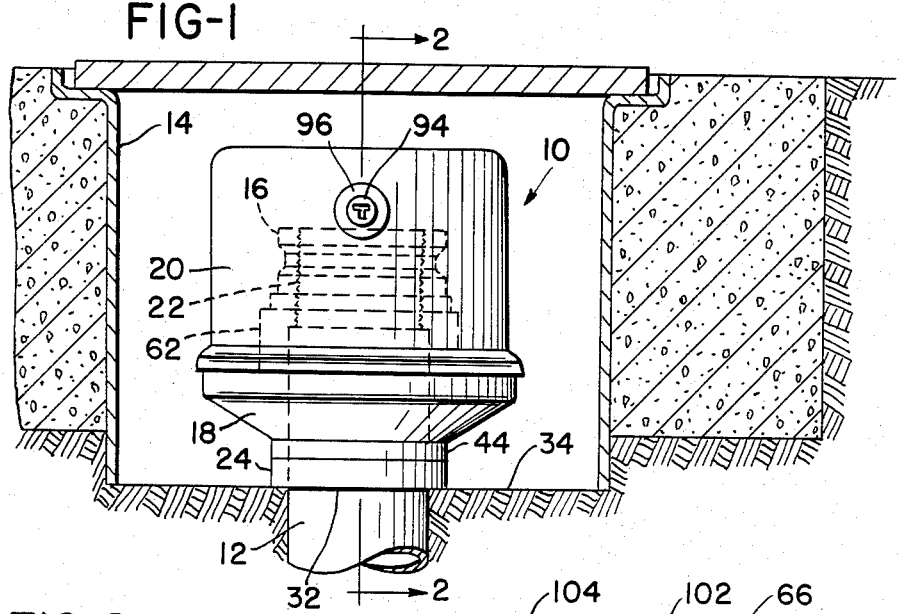
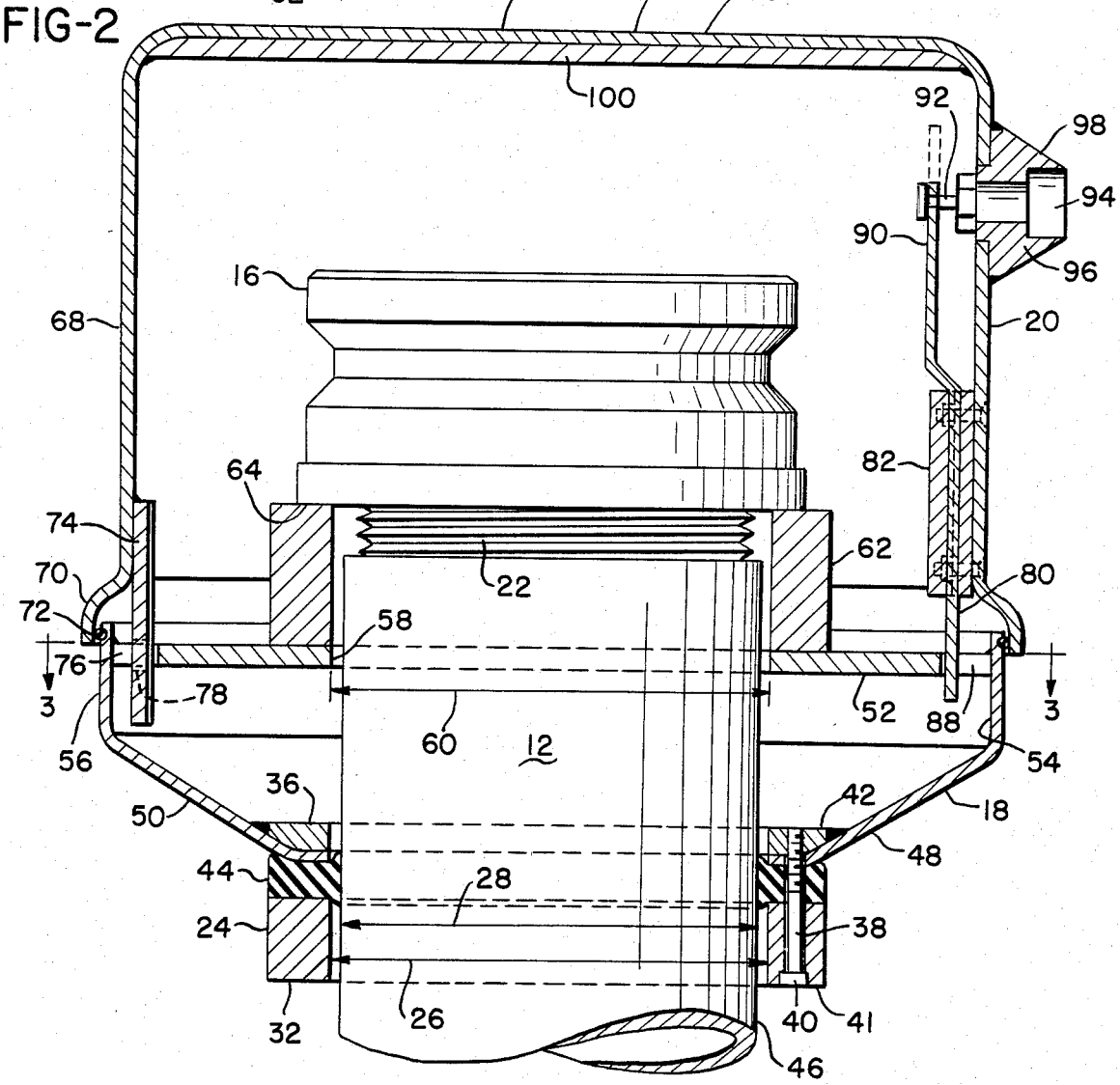

STANDPIPE SECURITY APPARATUS

BACKGROUND OF THE INVENTION

Standard locking devices for service station gas tanks are mounted to standpipes which typically extend into fillboxes positioned slightly beneath ground level of the service station. Such devices have filler adapters which are threaded to the pipe leading to the gas tank and a filler cap which is secured to the filler adapter by a standard lock. A typical example is shown in U.S. Pat. No. 1,461,400 to Ocheltree, Jr. Unfortunately, these devices are unsatisfactory, since the padlock on the filler cap can be destroyed easily by cutting with a saw or a bolt cutter or breaking by means of a sledge. Other locking devices are fuel tanks, such as shown in U.S. Pat. No. 1,747,205 to White, U.S. Pat. No. 1,908,593 to Fortune and U.S. Pat. No. 1,936,207 to Penn, are constructed so that with adequate purchase and force, they can be forcefully removed from any tank even if it means twisting the end of the standpipe off. Therefore there has been a need to provide a protective device for gasoline standpipes which frustrates quick and easy removal thereof without a proper key and in some embodiments indicates that an attempt at removal has failed.

BRIEF DESCRIPTION OF THE PRESENT INVENTION

The present invention provides security to the end of a standpipe by placing a steel shell completely about the end of the standpipe including its cap retained thereto. The device includes a lower housing attached to the standpipe. The lower housing is retained against upward movement by an interior abutment member which either engages the underside of a conventional latch cap or by thrust bearing means when a screw-on cap is employed. The thrust bearing means may be as simple as a stack of washers of suitable height and diameter which are positioned between the undersurface of the screw-on cap and the interior abutment member. In either case forceful rotation of the lower housing will not cause a release thereof. The cap itself is protected from direct removal by an upper housing which locks to the lower housing by means of a latch and slot arrangement, movable by means of a lock assembly and a plurality of dogs which rotatably engage slots in the lower housing. The dogs, latch, and slots can be at irregular positions so that the upper housings are not interchangeable. Therefore they can be painted to indicate that a particular fluid storage tank is available through the particular standpipe without the worry that housings from other standpipes of different marking could be mispositioned accidentally. The upper and lower housings are closely sized with respect to the fillbox well in which they normally sit so that it is difficult to gain a forceful purchase thereon. The upper housing is armored to prevent cutting therethrough and when a screw-on cap which might allow the escape of flammable vapor is employed, the housings are provided with seals to prevent escape of flammable vapors.

Therefore it is an object of the present invention to provide increased security to the standpipes of service stations and other facilities which store valuable liquids below the ground utilizing standpipes for access thereto.

Another object is to provide fuel tank security which yields to forceful attempts at entry without release.

Another object is to provide service station security at minimal cost.

Another object is to provide a fuel tank security device which also doubles as a sure indicator of the type of fluid retained thereunder.

These and other objects and advantages of the present invention will become apparent to those skilled in the art after considering the following detailed specification which covers preferred embodiments thereof in conjunction with the accompanying drawings wherein:

BRIEF DESCRIPTION OF THE DRAWINGS

FIG. 1 is a side view partially in cross-section of a standpipe exiting into a fillbox well protected by a device constructed according to the present invention;

FIG. 2 is a cross-sectional view of the present invention taken on lines 2—2 of FIG. 1;

DETAILED DESCRIPTION OF THE SHOWN EMBODIMENTS

Figure 3:
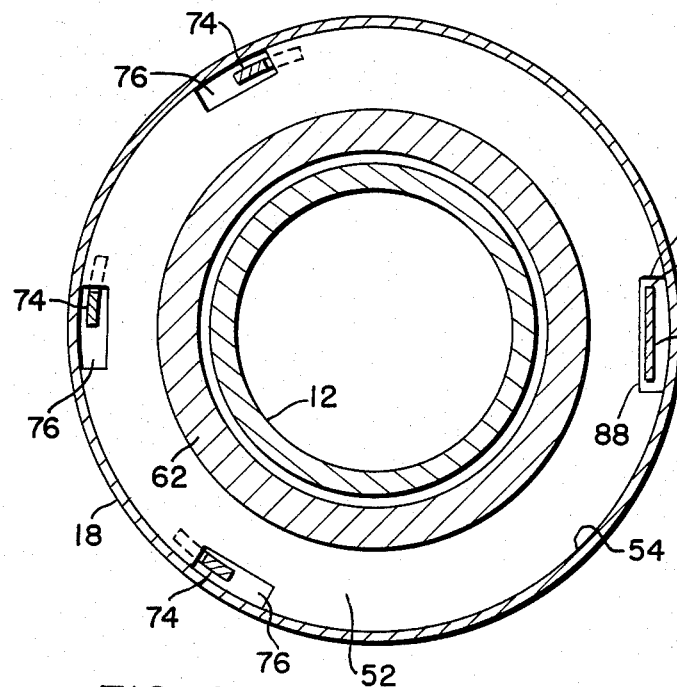
FIG. 3 is a top cross-sectional view taken at line 3—3 of FIG. 2.

Referring to the drawings more particularly by reference numbers, number 10 in FIG. 1 refers to a security device constructed according to the present invention installed on a standpipe 12 within a fillbox well 14 to protect a screw on standpipe cap 16 and thereby prevent unauthorized introduction or removal of fluids through the standpipe 12. As shown in FIG. 2, the security device 10 includes lower and upper housings 18 and 20 which together, when positioned as shown, surround the cap 16 to prevent the aforementioned undesired entry therethrough by the unscrewing of the cap 16 from a threaded portion 22 of the standpipe 12.

The lower housing 18 includes a bottom retaining ring 24 which has an inner diameter 26 just greater than the other diameter 28 of the standpipe 12. As can be seen in FIG. 1, it is preferable that the undersurface 32 of the ring 24 abut or be relatively closely adjacent the bottom surface 34 of the fillbox well 14 to prevent movement of the ring 24 downwardly more than a predetermined distance. The bottom retaining ring 24 is retained to an upper retaining ring 36 by screws 38 whose heads 40 can be countersunk into the bottom surface 41 of the bottom retaining ring 24 where they are inaccessible to tampering when the device 10 is positioned as shown in FIG. 1. Alternatively, the heads 40 can be positioned adjacent the upper retaining rings, upper surface 42 so that like the cap 16 they are protected by the device 10. The screws 38 cause the upper and lower retaining rings 24 and 36 to squeeze a seal 44 positioned therebetween so that the seal 44 engages the cylindrical outer surface 46 of the standpipe 12 to prevent escape of flammable vapors which leak past the cap 16 therepast. The possible presence of flammable vapor within the device 10 makes mechanical attack, such as cutting, grinding, or drilling a very dangerous proposition. The seal 44 is designed to slip when subjected to breaking force so that force applied to rotate the retaining ring 24 or move it up or down can be accomplished to an extent limited by other features of the device 10 without causing failure of the device 10 or of the standpipe 12 to which it is attached.

The upper retaining ring 36 is welded to a lower housing member 48 which includes a portion 50 which extends radially outwardly at an upward angle to prevent formation of a surface perpendicular to the standpipe 12 on which forceful purchase can be easily gained. A lock ring abutment member 52 extends about the inner surface 54 of an upper cylindrical portion 56 of the housing member 48. The member 52 includes an inner cylindrical surface 58 having a diameter 60 just larger than the diameter 28 of the standpipe 12. The member 52 supports thrust means such as a stack of washers 62, a thrust bearing or other suitable spacing device which is unable to transmit torque. The washers 62 are retained downwardly by the undersurface 64 of the cap 16. Therefore, when the cap 16 is in place, the lower housing 18 is restrained from upward movement by the washers 62 and the cap 16, and from downward movement by the lower surface 41 of the bottom retaining ring 24, and yet rotation thereof does not transfer a torque to the cap 16 to remove it.

The cap 16 is protected against direct removal by the upper housing 20. The upper housing includes an upper radial portion 66 which forms into a downwardly extending cylindrical portion 68. The cylindrical portion 68 includes a lower flange 70 which extends over and mates with the upper cylindrical portion 56 of the lower housing 18. An O-ring seal 72 is provided therebetween which along with seal 44 retains flammable vapor within the device 10 to make cutting drilling or grinding entry therein unwise and to prevent atmospheric contamination.

Figure 4:
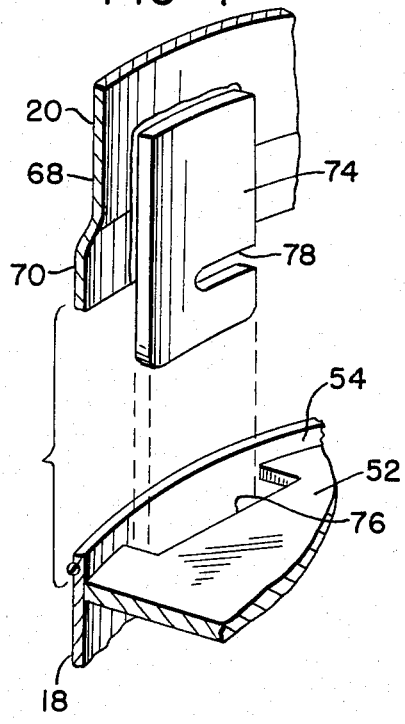
FIG. 4 is an enlarged detail view of the dog and slot arrangement of the device of FIG. 1 through 3.
Figure 5:
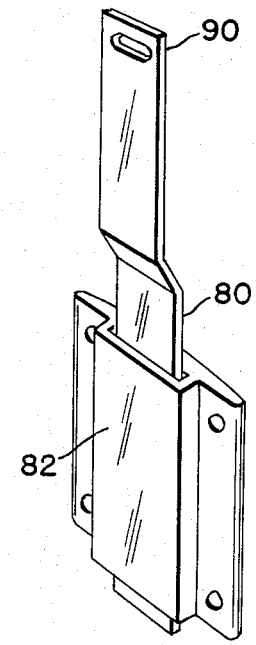
FIG. 5 is an enlarged detail view of the slide latch of the device of FIGS. 1 through 3.

The upper housing 20 is retained to the lower housing 18 by a plurality of lock dogs 74 and mating slots 76 positioned at predetermined locations about the periphery of the lock ring 52 as shown in FIGS. 3 and 4. The lock dogs 74 each include a sidewardly facing slot 78, all facing the same direction so that when the lock dogs 74 are inserted through the slots 76 as shown in FIG. 4, and then rotated as shown in FIG. 3, they prevent linear relative movement between upper and lower housings 20 and 18. When it is desired to prevent relative rotation of the lock dogs 74 and the slot 76, means such as a slide latch 80 is employed. The slide latch 80 is retained for vertical motion by a slide lock housing 82 connected to the cylindrical portion 68 of the upper housing 20. When the slide lock 80 is moved downwardly, its side edge 84 is positioned to abut the side 86 of a latch slot 88 formed like the slots 76 in the periphery of the lock ring 52. Therefore, the latch 80 is capable of being positioned to prevent relative rotation between the dogs 74 and the slot 76 and thereby lock the upper and lower housings 20 and 18 together. The slide latch includes an upper portion 90 which is connected to the output arm 92 of a lock cylinder 94 retained in an armoring cone 96 whose conical surface 98 prevents easy purchase of forceful tools from above.

To complete the security of the device 10, armor plate 100 is provided under the upper radial portion 66 and the outer surface 102 of the upper housing 20 is preferably coated with an acid resistant layer such as epoxy to shield against acid attack.

The predetermined positions of the locking dogs 74 and slots 76 can be varied for respective installations and respective fuel storage tanks, so that only matching upper and lower housings 20 and 18 can be connected. By combining this with a predetermined color scheme or marking to the epoxy coating 104, the device 10 can be keyed to the liquids within the tanks to prevent accidental mixing of an improper fuel or liquid into the tank.

Figure 8:
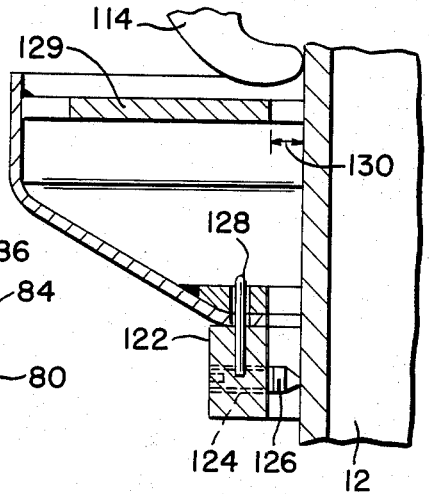
FIG. 8 is a detailed cross-sectional view similar to a portion of FIG. 2 showing the application of the retaining ring of FIG. 7 to the modified version of FIG. 6.
Figure 7:
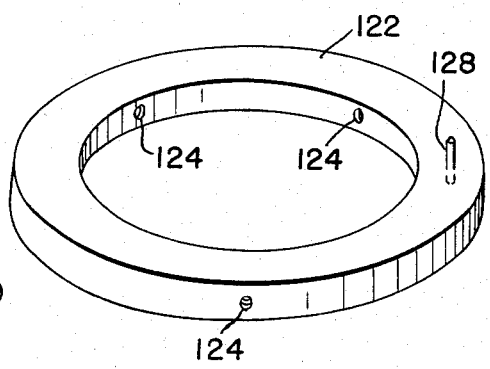
FIG. 7 is a perspective view of a modified lower retaining ring for the invention version of FIG. 6.
Figure 6:
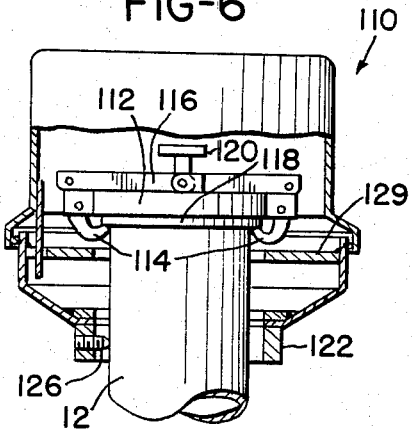
FIG. 6 is a side elevational view of a modified version of the invention for use with conventional clamp type caps.

A modified version 110 of the device 10 is shown in FIGS. 6, 7 and 8 for use when a conventional latched type cap 112 is employed. Since the cap 112 usually is larger in diameter than the screw on cap 16 and usually is in a close fitting fillbox well 14, the use of the device 110 usually requires the installation of a larger fillbox. However, when a complete service station rehabilitation is being performed, it allows the use of the conventional latch cap 112 and therefore is advantageous. A cap, such as cap 112 positively seals the standpipe 12 so that no vapor can escape therefrom. It employs a plurality of hooks 114 which are rotated by an overcenter linkage mechanism 116 into engagement with a lip 118 on the standpipe 12. A lock 120 can be used to prevent unwanted actuation of the linkage mechanism 116 and hence removal of the cap 112. However, such a mechanism 116 can be attacked easily with bolt cutters and therefore is much more secure when the device 110 is employed thereabout.

The differences between the device 110 and the device 10 are more clearly shown in FIGS. 7 and 8. In FIG. 7, a lower retaining ring 122 is shown which has at least three set screw holes 124 formed radially therethrough for use in fixing the lower retaining ring 122 to the standpipe 12. It is a function of the lower retaining ring 122 to block downward movement of the device 110.

A portion of the ring 122 is shown with one of its locking set screws 126 retaining it to the standpipe 12 in FIG. 8. A sheer pin 128 is provided between the lower retaining ring 122 and the remainder of the device 110 so that forceful torque applied thereto sheers the pin 128 rather than releasing the ring 22. If not otherwise obvious, a sheared shear pin indicates that someone has been tampering with the device 110. The device 110 is retained from upward movement by abutment between an abutment member 129 similar to the abutment member 52 and the hooks 114. Suitable clearance 130 is provided between the device 110 about the standpipe 112 so that it can clear the lip 118 when being installed or removed by an authorized person.

Thus there has been shown and described improved security devices for standpipes for protecting the fluid thereunder which fulfill all the objects and advantages sought therefore. Many changes, modifications, variations, other uses and applications of the subject invention will however become apparent to those skilled in the art after considering this specification together with the accompanying drawings and claims. All such changes, modifications, variations, other uses and applications which do not depart from the spirit and scope of the invention are deemed to be covered by the invention which is limited only by the claims which follow.

What is claimed is:

1. A security device for the end of a pipe having a cap, said security device including:
a first housing member having:
a ring portion engaging the pipe;

locking portion means adapted for engagement with the cap; and a housing portion extending between said ring portion and said locking portion means; and a second housing member having:
  a housing portion adapted to mate with said first housing member housing portion to form an enclosure about the cap; and
  locking means positioned to engage said locking portion means of said first housing member to releasably lock said first and second housing members together, said locking portion means of said first housing member including:
    a ring shaped flange extending inwardly from said housing portion of said first housing member defining a cutout therein through which the pipe can be extended, and said ring shaped flange including:
      an abutment surface facing the cap when said device is installed on the pipe; and
      bearing means positioned between said abutment surface of said ring shaped flange and the cap, whereby said bearing means prevent torque applied to said security device from transferring to the cap around which said security device is installed.

2. The security device defined in claim 1 wherein said ring portion of said first housing member includes:
a first ring fixedly connected to said first housing member housing portion;
a second ring connected to said first ring; and
a ring seal for squeezing between said first and second rings into contact with the pipe to form a seal therewith.

3. The security device defined in claim 2 further including:
an O ring seal positioned between said first and second housing members.

4. A security device for the end of a pipe having a cap, said security device including:
a first housing member having:
  a ring portion engaging the pipe;
  locking portion means adapted for engagement with the cap; and
  a housing portion extending between said ring portion and said locking portion means; and
a second housing member having:
  a housing portion adapted to mate with said first housing member housing portion to form an enclosure about the cap; and
  locking means positioned to engage said locking portion means of said first housing member to releasably lock said first and second housing members together, said locking portion means of said first housing member including:
    a ring shaped flange extending inwardly from said housing portion of said first housing member defining a cutout therein through which the pipe can be extended, said ring shaped flange having:
      an abutment surface facing the cap when said device is installed on the pipe; and
      a plurality of slots defined in the outer periphery thereof, and said locking means of said second housing member including:
        a plurality of lock dogs having sidewardly facing slots define therein positioned to extend into said plurality of slots defined in the outer periphery of said ring shaped flange and to engage said lock dogs sidewardly facing slots with said ring shaped flange when rotated in a first predetermined direction; and
        means to maintain said lock dogs and said ring shaped flange in engagement.

5. The security device defined in claim 4 wherein said means to maintain said lock dogs and said ring shaped flange in engagement include:
a latch adapted for movement into and out of one of said slots in said ring shaped flange; and
a lock mechanism to controllably move said latch into and out of said slot in said ring shaped flange, said lock mechanism extending through said housing portion of said second housing member.

6. The security device defined in claim 5 wherein said lock mechanism includes:
an key opening through said housing portion of said second housing member; and
a conical sleeve about said key opening extending from said housing portion of said second housing member.

7. The security device defined in claim 4 wherein said ring portion of said first housing member includes:
a first ring fixedly connected to said first housing member housing portion, said first ring having:
  a shear pin recepticle; and
a second ring including:
  means for connection to the pipe; and
  a shear pin extending into said shear pin recepticle.

8. The security device defined in claim 7 wherein said means for connection to the pipe include:
a plurality of set screws extending radially through said second ring.

9. The security device defined in claim 4 wherein said first housing member housing portion includes:
a frustroconical surface having a smaller diameter end adjacent said ring portion and a larger diameter end adjacent said locking portion means.

10. A security device for the end of a pipe having a cap, said security device including:
a first housing member having:
  a ring portion engaging the pipe;
  locking portion means adapted for non-torque transmitting engagement with the cap; and
  a housing portion extending between said ring portion and said locking portion means; and
a second housing member having:
  a housing portion adapted to mate with said first housing member housing portion to form an enclosure about the cap; and
  locking means positioned to engage said locking portion means of said first housing member to releasably lock said first and second housing members together.

* * * * *